US012571518B2

(12) United States Patent
Kurita

(10) Patent No.: US 12,571,518 B2
(45) Date of Patent: Mar. 10, 2026

(54) LIGHT SOURCE DEVICE

(71) Applicant: Panasonic Intellectual Property Management Co., Ltd., Osaka (JP)

(72) Inventor: Aya Kurita, Tokyo (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 0 days.

(21) Appl. No.: 18/893,006

(22) Filed: Sep. 23, 2024

(65) Prior Publication Data

US 2025/0012425 A1 Jan. 9, 2025

Related U.S. Application Data

(63) Continuation of application No. PCT/JP2023/002948, filed on Jan. 31, 2023.

(30) Foreign Application Priority Data

Mar. 25, 2022 (JP) .................................. 2022-049768

(51) Int. Cl.
*F21V 5/04* (2006.01)
*F21V 7/00* (2006.01)
(Continued)

(52) U.S. Cl.
CPC ............ *F21V 7/0033* (2013.01); *F21V 5/043* (2013.01); *F21V 5/048* (2013.01); *F21V 9/20* (2018.02);
(Continued)

(58) Field of Classification Search
CPC .......... F21V 5/043; F21V 7/0033; F21V 9/30; F21V 2200/17; G02B 6/0006;
(Continued)

(56) References Cited

U.S. PATENT DOCUMENTS

2005/0069255 A1* 3/2005 Nishimura ........... G02B 6/4206
385/27
2016/0195236 A1 7/2016 Kita

FOREIGN PATENT DOCUMENTS

JP 2006-133407 5/2006
JP 2009-266463 11/2009
(Continued)

OTHER PUBLICATIONS

International Search Report issued Apr. 4, 2023 in International (PCT) Application No. PCT/JP2023/002948.

*Primary Examiner* — Sean P Gramling
(74) *Attorney, Agent, or Firm* — Wenderoth, Lind & Ponack, L.L.P.

(57) ABSTRACT

A light source device includes: a first light source; first cylindrical lenses; a light beam merging unit disposed to narrow a width in a first direction of a light flux emitted from the first light source by allowing partial light from the first cylindrical lenses to pass through the light beam merging unit and reflecting remaining light; and a condenser lens configured to condense light emitted through the light beam merging unit. The first light source includes light emitting elements disposed side by side in the first direction in a first column, and collimator lens parts disposed corresponding to the light emitting elements in the first column. Each of the light emitting elements in the first column includes a first emitter that emits first light, and a second emitter that emits second light. Each of the collimator lens parts allows transmission of the first light and the second light.

4 Claims, 11 Drawing Sheets

(51) Int. Cl.
    *F21V 8/00*         (2006.01)
    *F21V 9/20*         (2018.01)
    *G03B 21/20*      (2006.01)
    *F21Y 113/13*     (2016.01)

(52) U.S. Cl.
    CPC ........ G02B 6/0006 (2013.01); *F21V 2200/17*
              (2015.01); *F21Y 2113/13* (2016.08)

(58) Field of Classification Search
    CPC ............ G03B 21/2013; G03B 21/2033; A61B
             1/0638; A61B 1/0646; A61B 1/0669;
                       A61B 1/0684
    See application file for complete search history.

(56)                References Cited

FOREIGN PATENT DOCUMENTS

| JP | 2017-211417 | 11/2017 |
| JP | 2018-138992 | 9/2018 |
| JP | 2021-167912 | 10/2021 |
| JP | 2005-107319 | 4/2025 |
| WO | 2015/056380 | 4/2015 |

* cited by examiner

LIGHT SOURCE DEVICE

TECHNICAL FIELD

The present invention relates to a light source device including an emitter that emits light.

BACKGROUND ART

Light source devices have been conventionally provided to cause light to be incident to optical fibers. The optical fibers are used as light guide members of endoscope systems or projectors, for example. Light emitted from the optical fibers allows clear images of affected parts to be captured or bright images thereof to be projected.

For example, a fiber light source of Unexamined Japanese Patent Publication No. 2018-138992 includes a solid light source that emits blue light and green light that are each laser light, and a wavelength conversion element that converts a part of the green light into red light as phosphor light, and generates white light by combining the blue light, the green light, and the red light. The generated white light is incident to an optical fiber.

Unfortunately, a requirement for an increase in the amount of white light in recent years causes a sufficient amount of light not to be secured with laser light from a single emitter when laser light is used as a light source of red light, and when the number of emitters is increased, light cannot be sufficiently condensed into an optical fiber due to increase in a light flux diameter, and thus causing a difficulty in acquiring high output light.

When white light obtained by adding phosphor light to laser light is incident into an optical fiber as in the technique described in the above-noted Unexamined Japanese Patent Publication No. 2018-138992, coupling efficiency to the optical fiber is reduced to lose a part of the white light. Thus, when high-output white light is made incident into the optical fiber, an end surface of the optical fiber may be damaged by burning light failing to be incident into the optical fiber.

SUMMARY OF THE INVENTION

It is an object of the present disclosure to provide a light source device that achieves both prevention of damage to an optical fiber and transmission of high-output light by improving coupling efficiency of light to be incident into the optical fiber.

A light source device according to the present disclosure includes: a first light source; a plurality of first cylindrical lenses; a light beam merging unit disposed to narrow a width in a first direction of a light flux emitted from the first light source by allowing partial light from the plurality of first cylindrical lenses to pass through the light beam merging unit and reflecting remaining light; and a condenser lens configured to condense light emitted through the light beam merging unit. The first light source includes a plurality of light emitting elements disposed side by side in the first direction in a first column, and a plurality of collimator lens parts disposed corresponding to the plurality of light emitting elements in the first column. Each of the plurality of light emitting elements in the first column includes a first emitter that emits first light, and a second emitter that emits second light. Each of the plurality of collimator lens parts allows transmission of the first light and the second light. The plurality of first cylindrical lenses is disposed corresponding to the plurality of light emitting elements in the first column to collimate the first light and the second light emitted from the first light source.

The present disclosure enables providing a light source device that achieves both prevention of damage to an optical fiber and transmission of high-output light by improving coupling efficiency of light to be incident into the optical fiber.

DETAILED DESCRIPTION OF THE INVENTION

Exemplary embodiments will be described in detail below with reference to the drawings as appropriate. Descriptions more in detail than necessary may not be described. For example, detailed descriptions of already well-known matters and duplicated description of substantially identical configurations may not be described. This is to avoid an unnecessarily redundant description below and to facilitate understanding of those skilled in the art.

The accompanying drawings and the descriptions below are provided to enable those skilled in the art to fully understand the present disclosure, and are not intended to limit subject matters described in the scope of claims.

First Exemplary Embodiment

[1-1. Configuration of Light Source Device]

Figure 1:
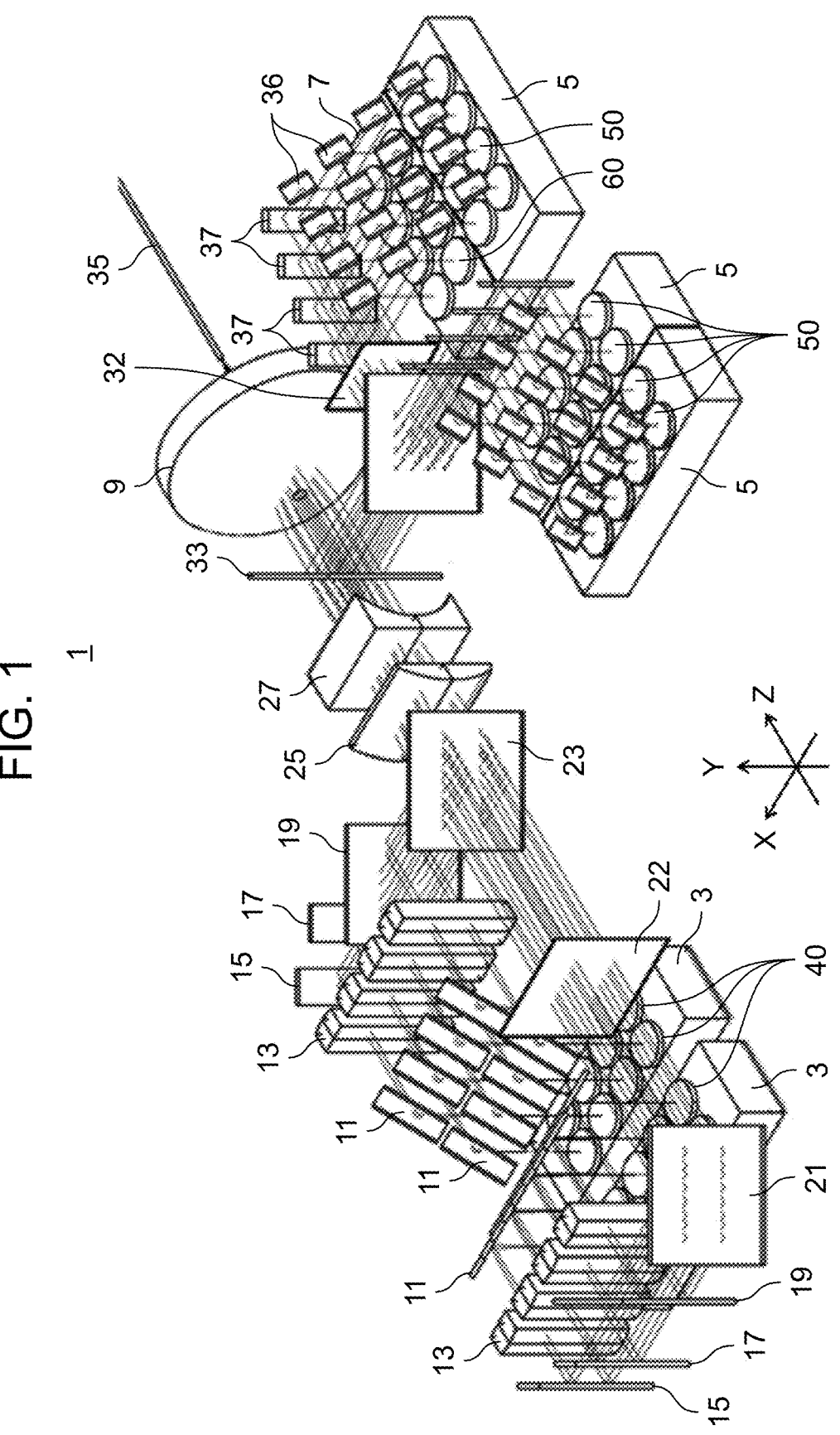
FIG. 1 is a perspective view illustrating a configuration of a light source device according to a first exemplary embodiment.
Figure 2:
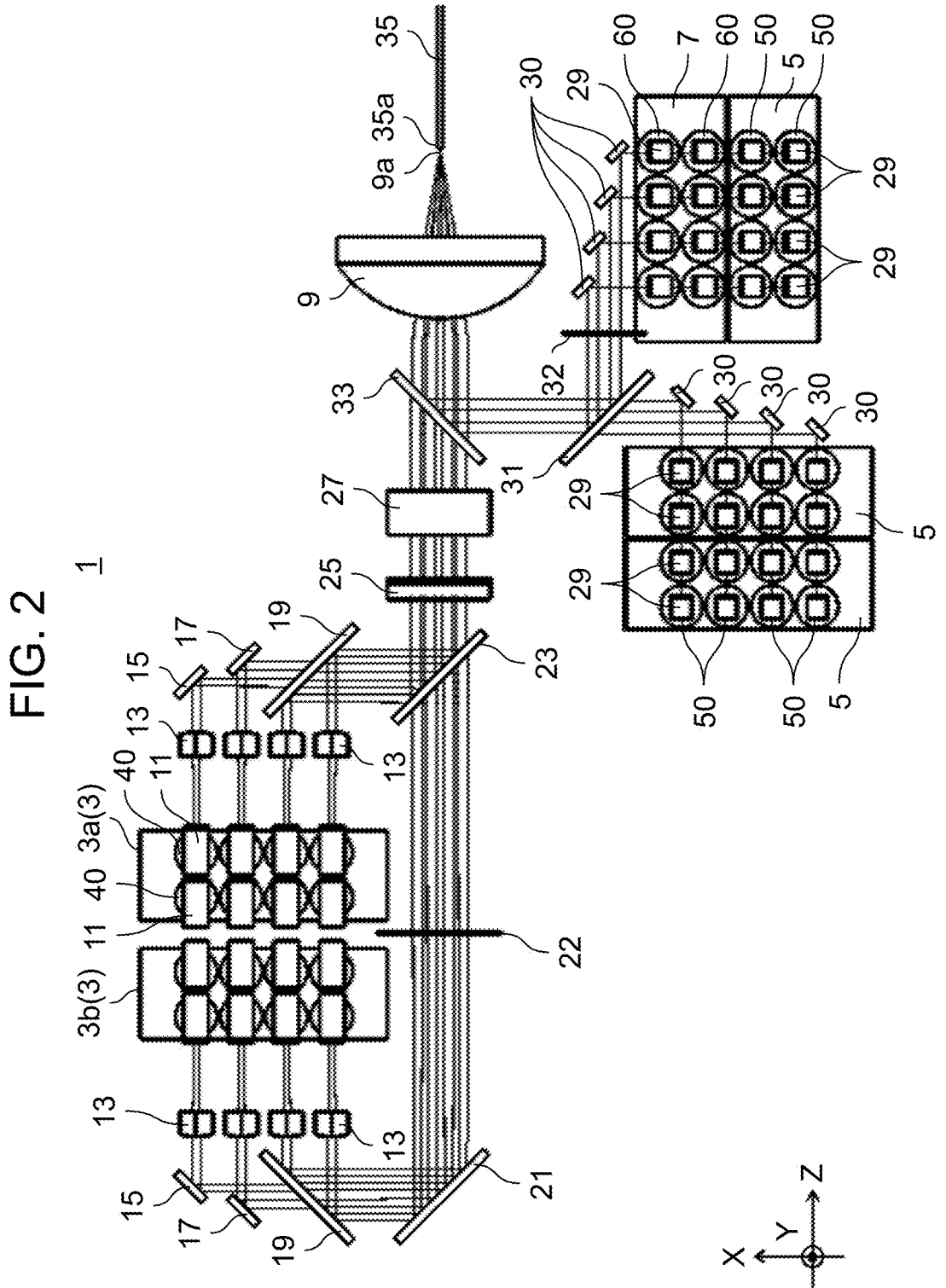
FIG. 2 is a plan view illustrating a configuration of the light source device according to the first exemplary embodiment.
Figure 3:
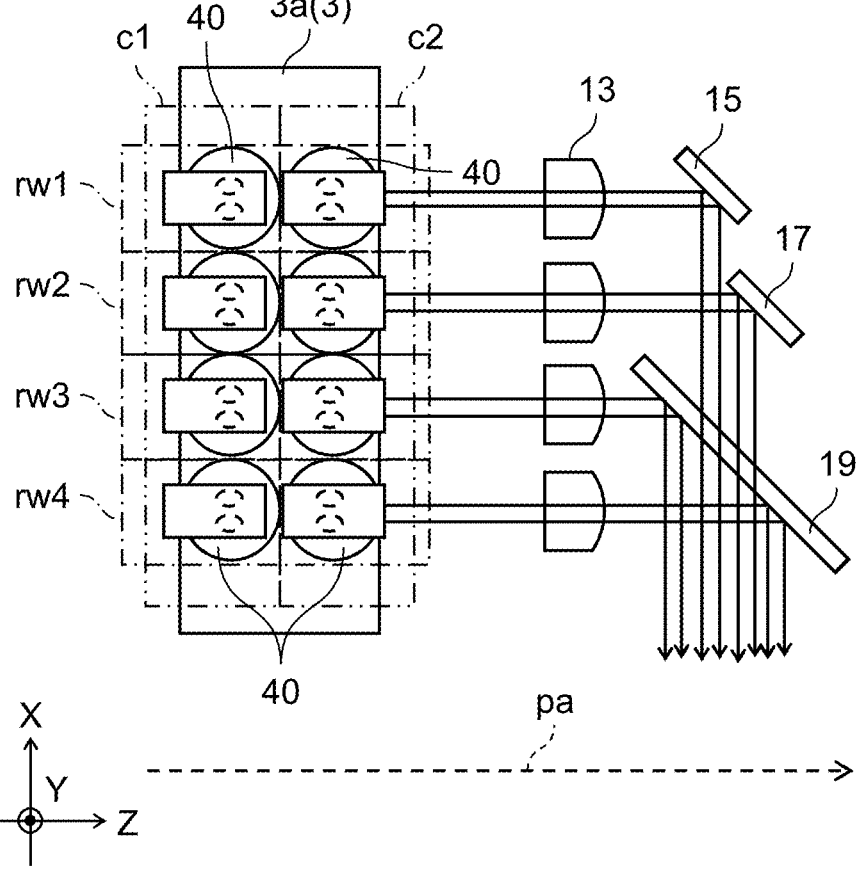
FIG. 3 is an enlarged plan view of a first light source according to the first exemplary embodiment.

With reference to FIGS. 1 and 2, light source device 1 according to a first exemplary embodiment will be described. FIG. 1 is a perspective view illustrating a configuration of light source device 1 according to the exemplary embodiment. FIG. 2 is a plan view of light source device 1. FIG. 3 is an enlarged plan view of first light source 3.

Light source device 1 includes first light source 3, second light source 5, third light source 7, dichroic mirror 33, and condenser lens 9. First light source 3 emits a red laser beam, second light source 5 emits a green laser beam, and third light source 7 emits a blue laser beam. Dichroic mirror 33 allows transmission of the red laser beam and reflects the blue and green laser beams to synthesize the red, blue, and green laser beams to generate white light. Condenser lens 9 has focal position 9a at which or at near which end 35a of optical fiber 35 is disposed, and the white light emitted from dichroic mirror 33 is condensed by condenser lens 9 and incident into optical fiber 35.

Light source device 1 also includes an optical path from first light source 3 to dichroic mirror 33, the optical path including reflection mirror 11, first cylindrical lens 13, reflection mirrors 15 and 17, light beam merging unit 19, reflection mirror 21, half-wave plate 22, polarization beam splitter 23, and second and third cylindrical lenses 25, 27. Light source device 1 further includes optical paths from second light source 5 and third light source 7 to dichroic mirror 33, the optical paths including reflection mirrors 29, 30, half-wave plate 32, and polarization beam splitter 31.

As illustrated in FIGS. 1 and 2, first light source 3 includes two light sources of first light sources 3a, 3b, and the two light sources of first light sources 3a, 3b are disposed side by side. First light sources 3a, 3b emit light beams identical in polarization direction.

When a matter common to first light sources 3a, 3b is described, the matter will be described for first light source 3.

[1-2. Configuration of Light Source Unit]

First light source 3 includes a plurality of first light source units 40 that emits red laser beams. First light source units 40 are disposed in a matrix form in an X-axis direction and a Z-axis direction, such as four rows for each of two columns, for example.

Although first light source 3a will be described with reference to FIG. 3, the same applies to first light source 3b. For facilitating description, two first light source units 40 farthest from optical axis pa of light incident on condenser lens 9 are referred to as first light source units 40 in first row rw1, and first light source units 40 are referred to first light source units 40 in second row rw2, third row rw3, and fourth row rw4 in order toward optical axis pa of the light incident on condenser lens 9. Then, four first light source units 40 away from first cylindrical lens 13 are referred to as first light source units 40 in first column c1, and four first light source units 40 close to first cylindrical lens 13 are referred to as first light source units 40 in second column c2.

Figure 4:
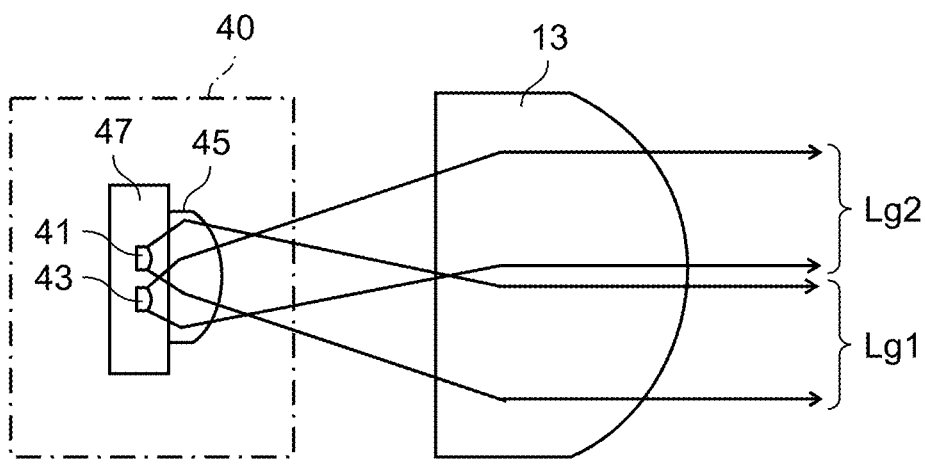
FIG. 4 is an explanatory diagram for illustrating collimation of light from the first light source according to the first exemplary embodiment.

Next, the following description refers to FIG. 4. FIG. 4 is an explanatory diagram for illustrating collimation of light from first light source 3. For facilitating description in FIG. 4, reflection mirror 11 disposed on an optical path between first light source 3 and first cylindrical lens 13 is not illustrated.

First light source unit 40 includes first emitter 41 that emits first emitter light Lg1 that is a red laser beam, second emitter 43 that emits second emitter light Lg2 that is also a red laser beam, and collimator lens 45 through which first emitter light Lg1 and second emitter light Lg2 pass. First and second emitters 41, 43 are each a solid-state light emitting element, and are each disposed in one light emitting element 47. Thus, light emitting element 47 is a multiemitter light emitting element. Then, first emitter light Lg1 and second emitter light Lg2 are collectively referred to as light Lga. Collimator lens 45 is an example of a collimator lens part.

First and second emitter lights Lg1, Lg2 respectively emitted from first and second emitters 41, 43 are incident on collimator lens 45. Collimator lens 45 emits incident first and second emitter lights Lg1, Lg2 while suppressing diffusion of first and second emitter lights Lg1, Lg2. One collimator lens 45 is commonly used for the two emitters, so that first and second emitter lights Lg1, Lg2 emitted from collimator lens 45 cannot be completely collimated. Thus, first and second emitter lights Lg1, Lg2 emitted from collimator lens 45 are made incident on first cylindrical lens 13. First cylindrical lens 13 collimates incident first and second emitter lights Lg1, Lg2 to prevent first and second emitter lights Lg1, Lg2 from separating from each other.

Figure 5:
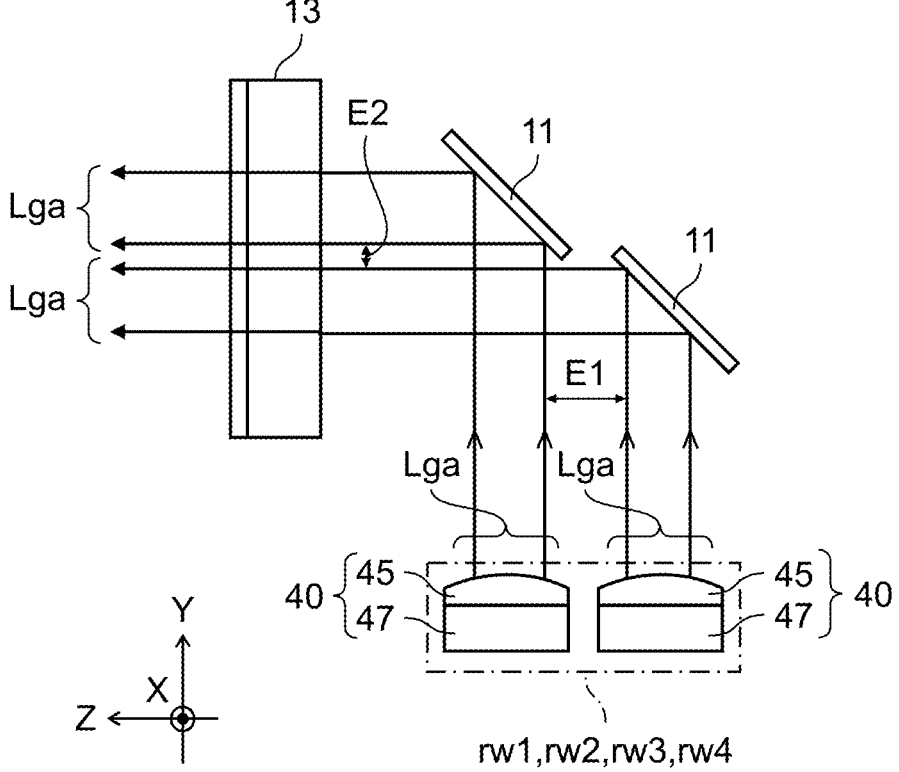
FIG. 5 is an enlarged side view of a periphery of a first light source unit according to the first exemplary embodiment.

Next, the following description refers to FIG. 5. FIG. 5 is an enlarged side view of a periphery of first light source unit 40. Reflection mirror 11 is disposed with adjustable inclination in a one-to-one correspondence with first light source unit 40. Thus, even when each of the plurality of first light source units 40 in first light source 3 emits light Lga with a variable optical axis, light Lga can be incident on first cylindrical lens 13 by adjusting inclination of reflection mirror 11 to correct inclination of light Lga. This configuration enables the optical axis of each light Lga emitted from first cylindrical lens 13 to be prevented from inclining.

Reflection mirrors 11 corresponding to two first light source units 40 are disposed away from each other in the Y-axis direction in a stepped manner. This configuration enables interval E2 of red light Lga reflected by reflection mirror 11 to be shorter than interval E1 of red light Lga in each column before red light Lga is incident on each reflection mirror 11, so that the red laser beam can be densified.

Each light Lga reflected by reflection mirror 11 travels along optical axis pa of condenser lens 9, and is collimated by first cylindrical lens 13. Lights Lga collimated by first cylindrical lens 13 includes light Lga from first light source unit 40 disposed in first row rw1 farthest from the optical axis of condenser lens 9, light Lga having a traveling direction bent by 90 degrees by reflection mirror 15 to travel in a direction perpendicular to optical axis pa of condenser lens 9.

Light Lga from first light source unit 40 disposed in second row rw2 is also collimated by first cylindrical lens 13, and has a traveling direction bent by 90 degrees by reflection mirror 17 to travel in the direction perpendicular to optical axis pa of condenser lens 9.

First and second emitter lights Lg1, Lg2 from first light source units 40 disposed in third row rw3 and fourth row rw4 are collimated by first cylindrical lens 13, and have a traveling direction bent by 90 degrees by light beam merging unit 19 to travel in a direction perpendicular to an optical axis of light incident on condenser lens 9.

Figure 6:
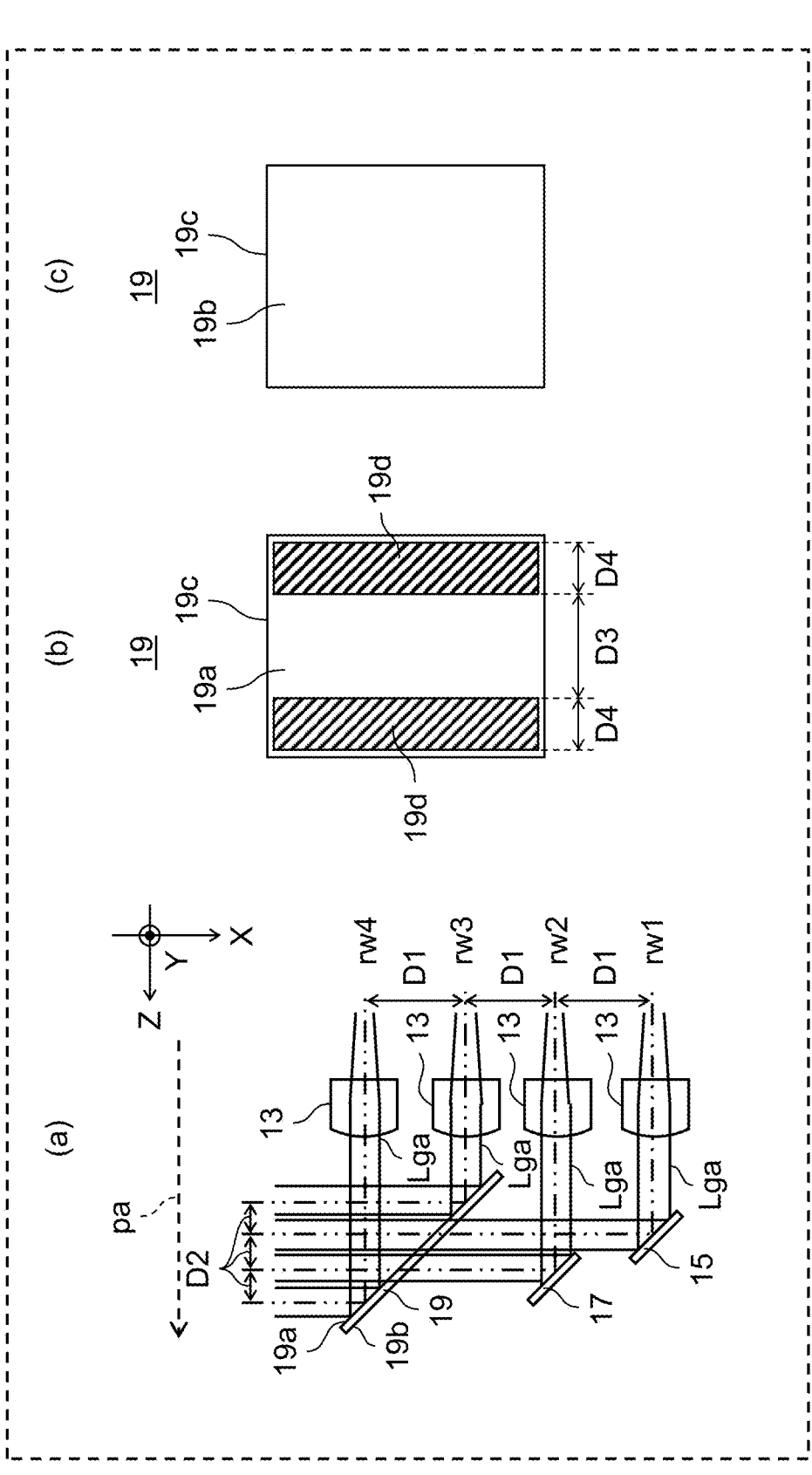
FIG. 6 is an explanatory diagram illustrating a configuration of a light beam merging unit according to the first exemplary embodiment.

Next, light beam merging unit 19 will be described with reference to FIGS. 1, 2, and 6. Part (a) of FIG. 6 is an explanatory diagram illustrating a configuration around light beam merging unit 19, part (b) of FIG. 6 is an explanatory diagram illustrating one surface (first surface 19a) of light beam merging unit 19, and part (c) of FIG. 6 is an explanatory diagram illustrating the other surface (second surface 19b).

Light beam merging unit 19 shortens a distance between light fluxes in the X-axis direction of light Lga traveling from first light source unit 40 in each of first row rw1 to fourth row rw4 to increase density of light.

Light beam merging unit 19 includes first surface 19a and second surface 19b, facing each other. First surface 19a receives light Lga emitted from first light source unit 40 in each of third row rw3 and fourth row rw4. Second surface 19b receives light Lga from first light source unit 40 in first row rw1 after being reflected by reflection mirror 15, and light Lga from first light source unit 40 in second row rw2 after being reflected by reflection mirror 17.

Light beam merging unit 19 includes a colorless and transparent translucent member serving as base material 19c, and reflection regions 19d disposed on both sides of first surface 19a to reflect light. Base material 19c is a plate material made of glass or resin, for example. Reflection region 19d includes a reflecting film formed on base material 19c, for example. Light beam merging unit 19 includes a center region that serves as a transmission region through which light passes while being located between two reflection regions 19d. Two reflection regions 19d each have width D4 in a range from about 4 mm to 10 mm, and transmission region has width D3 in a range from about 8 mm to 12 mm. No reflection region is disposed on second surface 19b.

Reflection mirrors 15 and 17 are disposed to allow light Lga reflected by each mirror to pass through the transmission region of light beam merging unit 19. Light beam merging unit 19 is disposed to allow light Lga emitted from first light source unit 40 in third row rw3 to be reflected by one of reflection regions 19d, and light Lga emitted from first light source unit 40 in fourth row rw4 to be reflected by the other of reflection regions 19d.

As described above, distance D1 between the centers of light fluxes of light Lga emitted from first light source unit 40 in each row can be shortened to distance D2 between the centers of the light fluxes of light Lga after light Lga is emitted from light beam merging unit 19. Although the first exemplary embodiment shows an example in which three distances D2 illustrated in FIG. 6(a) are equal to each other, reflection mirrors 15, 17 and light beam merging unit 19 may be configured to have distances D2 different from each other.

As illustrated in FIG. 2, each light Lga emitted from first light source 3b is integrated into one light flux densified by light beam merging unit 19, and then reflected by reflection mirror 21 in the Z-axis direction. Between reflection mirror 21 and polarization beam splitter 23, half-wave plate 22 is disposed, and light Lga reflected by reflection mirror 21 passes through half-wave plate 22 to have a polarization direction rotated by 90 degrees. Light Lga having passed through half-wave plate 22 is incident into polarization beam splitter 23 as P-polarized light and passes through polarization beam splitter 23. Each light Lga emitted from first light source 3a is integrated into one light flux densified by light beam merging unit 19, then is incident into polarization beam splitter 23 as S-polarized light to be reflected in the Z-axis direction. Here, polarization beam splitter 23 allows transmission of P-polarized light Lga from half-wave plate 22 directly in the Z-axis direction, and reflects S-polarized light Lga emitted from first light source 3a in the Z-axis direction. As a result, light Lga emitted from first light source 3a and light Lga emitted from first light source 3b can be merged.

Figure 7:
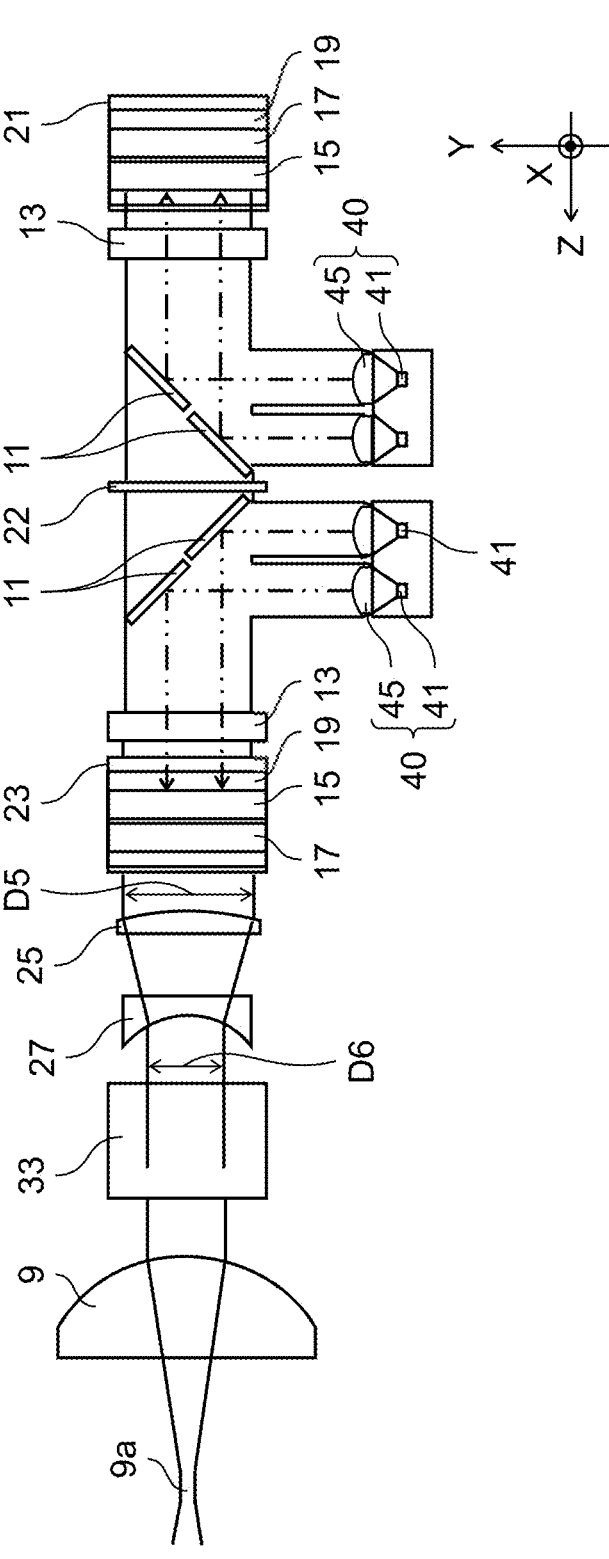
FIG. 7 is a side view illustrating a configuration of the light source device of the first exemplary embodiment.

Next, second cylindrical lens 25 and third cylindrical lens 27 will be described with reference to FIG. 7. Second cylindrical lens 25 and third cylindrical lens 27 each reduce a light flux of a red laser beam in the Y-axis direction. Each of first emitter 41 and second emitter 43 configured to emit the red laser beam has a larger width of an emitted light flux than emitters configured to emit blue and green laser beams, so that the width of the light flux is reduced by the two cylindrical lenses.

The red laser beam emitted from third cylindrical lens 25 has width D6 in the Y-axis direction that is smaller than width D5 in the Y-axis direction of the red laser beam traveling from polarization beam splitter 23 before being incident on second cylindrical lens 27. As a result, the width of the light flux of the red laser beam can be matched with the width of the light flux of each of the blue and green laser beams, so that white light synthesized by dichroic mirror 33 can be condensed into the optical fiber by one condenser lens 9. The red laser beam emitted from third cylindrical lens 27 is incident on dichroic mirror 33.

Next, second light source 5 will be described with reference to FIGS. 1 and 2. Second light source 5 includes a plurality of second light source units 50 that emits green laser beams. Second light source units 50 are disposed in a matrix form in an X-axis direction and a Z-axis direction, such as four rows for each of two columns, for example.

Second light source unit 50 includes one emitter that emits a green laser beam, and a collimator lens that collimates the light emitted from the emitter. Thus, second light source unit 50 includes a light emitting element of a single emitter. Light source device 1 includes three second light sources 5.

Two second light sources 5 are disposed side by side, and one second light source 5 and one third light source 7 are disposed side by side. Two second light sources 5 are disposed side by side, so that second light source units 50 are disposed in a matrix of four rows for each of four columns.

Reflection mirror 29 is disposed with adjustable inclination in a one-to-one correspondence with second light source unit 50. Thus, even when each of second light source units 50 emits a green laser beam forming a light flux with an optical axis variable in inclination due to an individual difference of each of second light source units 50, the green laser beam can be incident on reflection mirror 30 by adjusting inclination of each reflection mirror 29 that reflects the green laser beam to correct inclination of the optical axis of the green laser beam. This configuration enables preventing inclination of the optical axis of the green laser beam emitted from each reflection mirror 30.

Reflection mirrors 29 are disposed away in the Y-axis direction from respective four second light source units 50 for each row. This configuration causes an interval of the green laser beams reflected by reflection mirror 29 to be shorter than an interval of the green laser beams from each column before being incident on each reflection mirror 29, so that the green laser beams can be densified.

Reflection mirror 30 is disposed corresponding to each row, and reflection mirrors 30 are disposed away from each other in a traveling direction of the green laser beam reflected by reflection mirror 29. This configuration causes an interval of the green laser beams reflected by reflection mirror 30 to be shorter than an interval of the green laser beams from each row before being incident on each reflection mirror 30, so that the green laser beams can be further densified.

Reflection mirrors 30 disposed to be shifted from each other in a traveling direction of the green laser beam reflected by reflection mirror 29 reflect respective four green laser beams to change their traveling directions, so that the green laser beams are densified. The densified green laser beams are incident on polarization beam splitter 31 as P-polarized light. Polarization beam splitter 31 is configured to reflect a blue laser beam, and is configured to reflect S-polarized light in the green laser beam and allow transmission of the P-polarized light. Sixteen green laser beams pass through polarization beam splitter 31 to be reflected by dichroic mirror 33.

Next, third light source 7 will be described. Third light source 7 includes a plurality of third light source units 60 that emit blue laser beams. Third light source units 60 are disposed in a matrix form in an X-axis direction and a Z-axis direction, such as four rows for each of two columns, for example.

Third light source unit 60 includes one emitter that emits a blue laser beam, and a collimator lens that collimates the light emitted from the emitter. Thus, third light source unit 60 includes a light emitting element of a single emitter. Light source device 1 includes one third light source 7.

Reflection mirror 29 is also disposed with adjustable inclination in a one-to-one correspondence with third light source unit 60. Thus, even when each of third light source units 60 emits a blue laser beam forming a light flux with an optical axis variable in inclination due to an individual difference of each of third light source units 60, the blue laser beam can be incident on reflection mirror 29 by adjusting inclination of each reflection mirror 29 that reflects the blue laser beam to correct inclination of the optical axis of the blue laser beam. This configuration enables preventing inclination of the optical axis of the blue laser beam emitted from each reflection mirror 29.

One second light source 5 and one third light source 7 are disposed side by side, so that second light source units 50 and third light source units 60 are disposed in a matrix of four rows for each of four columns.

Reflection mirrors 29 are disposed away in the Y-axis direction from respective two second light source units 50 and respective two third light source units 60 for each row. This configuration causes an interval of each of the green and blue laser beams reflected by reflection mirror 29 to be shorter than an interval of each of the green and blue laser beams from each column before being incident on each reflection mirror 29, so that a light flux can be densified.

Reflection mirror 30 is disposed corresponding to each row, and reflection mirrors 30 are disposed away from each other in a traveling direction of each of the green and blue laser beams reflected by reflection mirror 29. This configuration causes an interval of each of the green and blue laser beams reflected by reflection mirror 30 to be shorter than an interval of each of the green and blue laser beams from each row before being incident on each reflection mirror 30, so that a light flux can be densified.

The green and blue laser beams are reflected by reflection mirrors 29 and 30 to be changed in traveling direction and densified, and then travel toward polarization beam splitter 31. Between reflection mirror 30 and polarization beam splitter 31, half-wave plate 32 is disposed to rotate a polarization direction of the green laser beam passing through half-wave plate 32 by 90 degrees. Eight P-polarized blue laser beams and eight green laser beams converted into S-polarized light with polarization directions rotated by half-wave plate 32 are reflected by polarization beam splitter 31 and further reflected by dichroic mirror 33. The green and blue laser beams emitted from polarization beam splitter 31 as described above and a red laser beam emitted from third cylindrical lens 27 are synthesized by dichroic mirror 33.

When light source device 1 does not include reflection mirrors 15, 17, light beam merging unit 19, and second and third cylindrical lenses 25, 27, i.e., when red light is not densified, in the first exemplary embodiment, a light flux of entire red light in the Y-axis direction has a width of 20 mm, and the light flux of the red light in the X-axis direction has a width of 38 mm. This case has a coupling efficiency of 35%. Here, the coupling efficiency is a ratio of the amount of red light incident into optical fiber 35 without being reflected at an inlet of optical fiber 35 to the entire amount of red light reaching the optical fiber 35.

In contrast, when light source device 1 includes reflection mirrors 15, 17 and light beam merging unit 19, the light flux of the red light in the Y-axis direction has a width of 20 mm, and the light flux of the red light in the X-axis direction has a width reduced to 15 mm. This case has a coupling efficiency improved to 75%. When light source device 1 further includes second and third cylindrical lenses 25, 27, the light flux of the red light in the Y-axis direction has a width reduced to 12 mm, and the light flux of the red light in the X-axis direction has a width of 15 mm. This case has a coupling efficiency improved to 85%.

[1-3. Effects, Etc.]

As described above, light source device 1 includes: first light source 3; a plurality of first cylindrical lenses 13; light beam merging unit 19 disposed to narrow a width in the X-direction of a light flux emitted from first light source 3 by allowing partial light from the plurality of first cylindrical lenses 13 to pass through the light beam merging unit and reflecting remaining light; and condenser lens 9 configured to condense light emitted through light beam merging unit 19. First light source 3 includes a plurality of light emitting elements 47 disposed side by side in the X-axis direction in a first column and a plurality of collimator lenses 45 disposed corresponding to the plurality of light emitting elements 47 in the first column. Light emitting element 47 includes first emitter 41 that emits first emitter light Lg1 and second emitter 43 that emits second emitter light Lg2, and collimator lens 45 allows transmission of first emitter light Lg1 and second emitter light Lg2. The plurality of first cylindrical lenses 13 is disposed corresponding to the plurality of light emitting elements 47 in the first column to collimate first emitter light Lg1 and second emitter light Lg2 emitted from first light source 3.

Light fluxes emitted from the plurality of first light emitting elements 47 disposed side by side in the X-axis direction can be reduced in width by light beam merging unit 19, so that coupling efficiency of light to be incident into optical fiber 35 can be improved, and thus light source device 1 can be provided in which both prevention of damage to an optical fiber and transmission of high-output light are achieved. Additionally, a light flux diameter of light to be incident into optical fiber 35 can be reduced, so that an optical fiber having a large diameter or a large numerical aperture is not required. The optical fiber can be reduced in diameter, so that cost of the optical fiber itself can be greatly reduced. The optical fiber can be reduced also in numerical aperture, so that an optical fiber made of a material such as a resin having low durability does not need to be used. Thus, the optical fiber can be improved in reliability.

First light source 3 of light source device 1 also includes a plurality of light emitting elements 47 in a second column that is disposed side by side in the Z-axis direction intersecting the X-axis direction to correspond to the plurality of light emitting elements 47 in the first column. One light emitting element 47 of the plurality of light emitting elements 47 disposed side by side in the Z-axis direction in the first column and one light emitting element 47 of the plurality of light emitting elements 47 disposed side by side in the Z-axis direction in the second column emit first emitter light Lg1 and second emitter light Lg2 that are reflected by reflection mirror 11 and collimated by one first cylindrical lens 13. Although an example has been described in first light source 3 in which two light emitting elements 47 are disposed side by side in the Z-axis direction, the number of light emitting elements 47 disposed side by side in the Z-axis direction may be three or more. This case also enables light from the plurality of light emitting elements 47 to be collimated by one first cylindrical lens 13 by disposing reflection mirror 11 corresponding to each light emitting element 47.

The plurality of light emitting elements 47 disposed in the Z-axis direction emits a plurality of light fluxes that passes through collimator lens 45 and that can be reduced in entire width by narrowing an interval between the light fluxes using reflection mirror 11, so that coupling efficiency of light to be incident into optical fiber 35 can be improved, and thus light source device 1 can be provided in which both prevention of damage to an optical fiber and transmission of high-output light are achieved.

Light source device 1 also includes reflection mirror 11 disposed on an optical path between each collimator lens 45 and first cylindrical lens 13. This configuration enables correcting inclination of light Lga emitted from each light emitting element 47 and having passed through collimator lens 45.

First light source 3 includes light emitting element 47 in which first emitter 41 and second emitter 43 are disposed. First emitter 41 and second emitter 43 are disposed while being integrated into one light emitting element 47, so that not only first light source 3 can be reduced in size, but also high-output light can be emitted with a light flux reduced in width.

On an optical path between light beam merging unit 19 and condenser lens 9, one set of cylindrical lenses (second and third cylindrical lenses 25, 27) is provided. This configuration enables the light flux to be reduced in width in the Y-axis direction different from a direction in which the light flux is reduced in width by light beam merging unit 19, so that the coupling efficiency of light to be incident into optical fiber 35 can be further improved, and thus damage to optical fiber 35 can be further prevented.

Light source device 1 includes second light source 5 that emits green light, third light source 7 that emits blue light, and optical fiber 35 into which light condensed by condenser lens 9 is incident. First emitter light Lg1 and second emitter light Lg2 are each red light, and light emitted from each of first light source 3, second light source 5, and third light source 7 is incident on condenser lens 9.

When the red light of first emitter light Lg1 and second emitter light Lg2 are densified, the red light can have a light flux with a width similar to that of the green light or the blue light, and thus synthesized white light can be condensed into the optical fiber by one condenser lens 9.

Second Exemplary Embodiment

[2-1. Configuration of Light Source Device]

Figure 8:
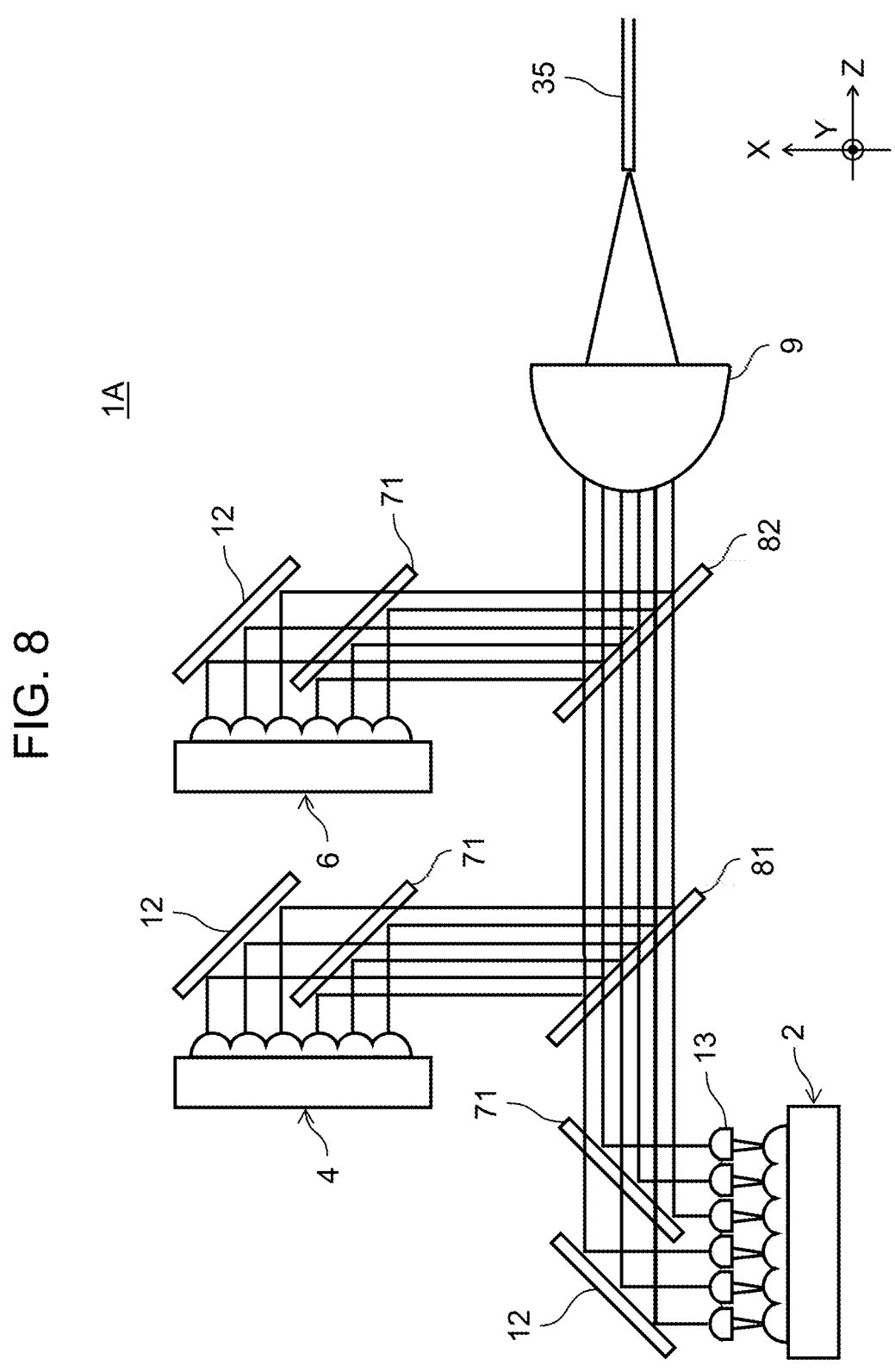
FIG. 8 is a plan view illustrating a configuration of a light source device according to a second exemplary embodiment.

FIG. 8 illustrates a configuration of light source device 1A according to a second exemplary embodiment. As illustrated in FIG. 8, light source device 1A includes first light source 2, second light source 4, third light source 6, first cylindrical lens 13, three reflection mirrors 12, three light beam merging units 71, dichroic mirror 81, dichroic mirror 82, and condenser lens 9. Light source device 1A synthesizes light (e.g., red laser beams) emitted from first light source 2, light (e.g., green laser beams) emitted from second light source 4, and light (e.g., blue laser beams) emitted from third light source

6, and condenses the synthesized light into optical fiber 35. The same components as those of light source device 1 of the first exemplary embodiment are denoted by the same reference numerals, and duplicated description will not be described.

The light emitted from first light source 2 passes through first cylindrical lens 13, and is partially reflected by reflection mirror 12 to pass through light beam merging unit 71, and remaining light is reflected by light beam merging unit 71. The light emitted from second light source 4 and the light emitted from third light source 6 are each partially reflected by reflection mirror 12 to pass through light beam merging unit 71, and remaining light is reflected by light beam merging unit 71. As illustrated in FIG. 8, an optical axis interval of light emitted from each light emitting element of first to third light sources 2, 4, 6 is reduced by light beam merging unit 71, and a width of a light flux of each light emitted from first to third light sources 2, 4, 6 is reduced.

Light emitted from the first light source 2 passes through two dichroic mirrors 81, 82 and reaches condenser lens 9. Light emitted from second light source 4 is reflected by dichroic mirror 81, and passes through dichroic mirror 82 to reach condenser lens 9. Light emitted from third light source 6 is reflected by dichroic mirror 82 and reaches condenser lens 9. As described above, red light emitted from first light source 2 and green light emitted from second light source 4 are synthesized by dichroic mirror 81, and the synthesized light and blue light emitted from third light source 6 are synthesized by dichroic mirror 82, and condensed by the condenser lens 9 to be incident into optical fiber 35.

Dichroic mirror 81 has characteristics of allowing transmission of red light and reflecting green light. Dichroic mirror 82 has characteristics of allowing transmission of red light and green light and reflecting blue light.

Figure 9:
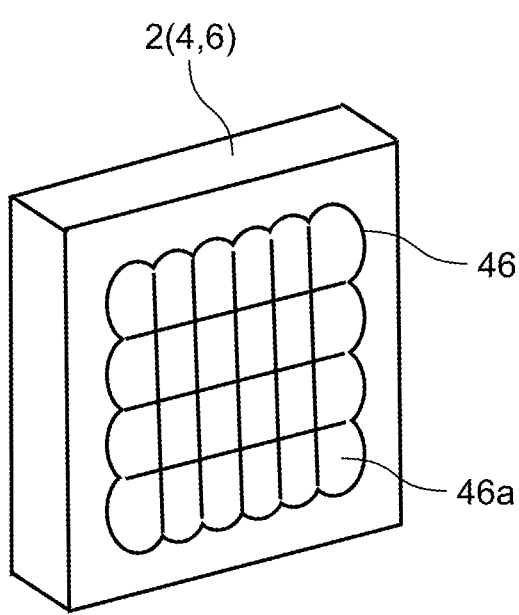
FIG. 9 is a perspective view illustrating an appearance of a first light source according to the second exemplary embodiment.

FIG. 9 is a perspective view illustrating an appearance of the first light source. First to third light sources 2, 4, 6 are identical in appearance. First to third light sources 2, 4, 6 each include a plurality of light emitting elements provided with emitters that emit light, the light emitting elements being disposed in an array (four columns for each of six rows) and disposed at short intervals. Thus, collimator lens part 46a for collimating emitted light is bonded to collimator lens part 46a of adjacent light emitting element 47 to form collimator lens array 46. That is, first to third light sources 2, 4, 6 are different from first to third light sources 3, 5, 7 of the first exemplary embodiment, each of which includes a plurality of collimator lenses corresponding to the plurality of light emitting elements, in including one collimator lens array corresponding to all of the plurality of light emitting elements.

Figure 10:
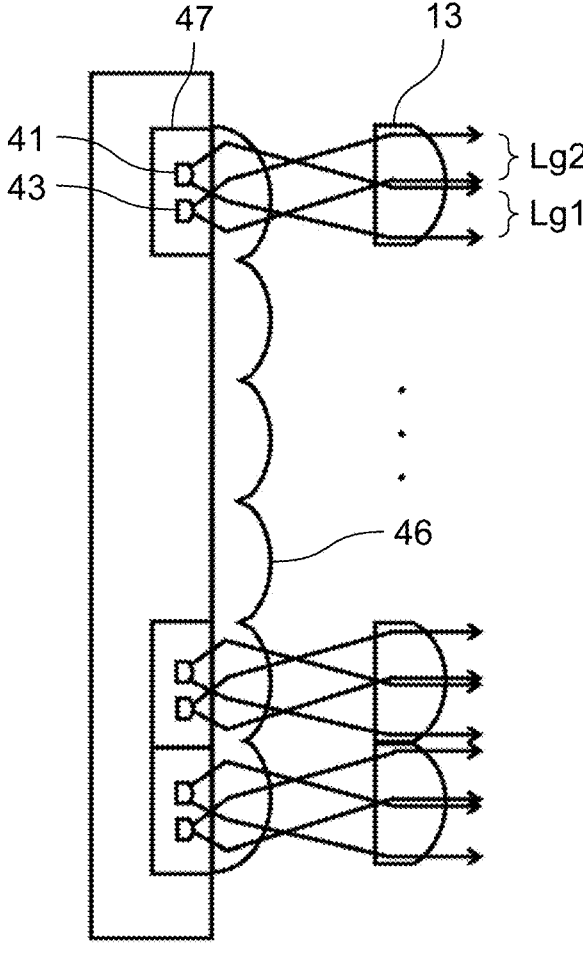
FIG. 10 is an explanatory diagram for illustrating collimation of light from the first light source according to the second exemplary embodiment.

FIG. 10 is an explanatory diagram for illustrating collimation of light from the first light source. First light source 2 includes two emitters (first and second emitters 41, 43) for each light emitting element 47 to obtain high output as with first light source 3 of the first exemplary embodiment, and first emitter light Lg1 and second emitter light Lg2 respectively emitted from first and second emitters 41, 43 and having passed through collimator lens array are not parallel light. First emitter light Lg1 and second emitter light Lg2 are substantially collimated when passing through first cylindrical lens 13 disposed at a position at which first emitter light Lg1 and second emitter light Lg2 are separated. Second light source 4 and third light source 6 also may use a light emitting element including a plurality of emitters. In this case, first cylindrical lens 13 may be also disposed to correspond to each of second light source 4 and third light source 6.

Figure 11:
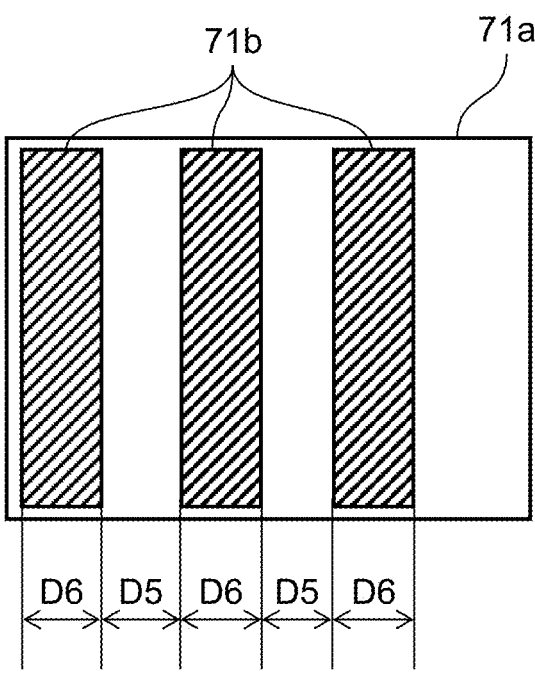
FIG. 11 is an explanatory diagram illustrating a configuration of a light beam merging unit according to the second exemplary embodiment.

FIG. 11 illustrates a configuration of light beam merging unit 71. Light beam merging unit 71 includes reflection region 71*b* partially formed on a surface of base material 71*a* that allows transmission of light. Base material 71*a* is a plate material made of glass or resin, for example. Light source device 1A includes three reflection regions 71*b* that are each in a rectangular shape elongated in a row direction and that are disposed corresponding to placement of the light emitting elements. Three reflection regions 71*b* each have width D6 of about 3 mm to 5 mm, and a region allowing transmission of light (transmission region) between reflection regions 71*b* has width D5 of about 3 mm to 5 mm. First to third light sources 2, 4, 6 each emit light including partial light from the light emitting elements disposed in three rows, the partial light being reflected by reflection region 71*b*, and another light from the light emitting elements disposed in another three rows, the other light being reflected by reflection mirror 12 and then passing through light beam merging unit 71 (a region where reflection region 71*b* of base material 71*a* is not formed). As a result, light beam merging unit 71 can merge incident light from two directions.

The placement of first to third light sources 2, 4, 6 may be different from that in the example illustrated in FIG. 8. In this case, light can be similarly synthesized by using a dichroic mirror having different characteristics instead of dichroic mirrors 81, 82, or changing a form of mirror placement. For example, although light source device 1A includes first light source 2 disposed with light emitting elements 47 in placement in which a column direction is the Z-axis direction, the column direction in the placement of light emitting elements 47 may be the X-direction as in second and third light sources 4, 6. First light source 2 can also be disposed with light emitting elements 47 in placement in which the column direction is the X-axis direction and a row direction is the Z-axis direction, or the column direction is the Z-axis direction and the row direction is the X-axis direction. In this case, an emission direction (Y-axis direction) of light from first light source 2 can be changed to the Z-axis direction or the X-axis direction by using reflection mirror 11 as described in the first exemplary embodiment.

[2-2. Effects, Etc.]

As described above, light source device 1A includes: first light source 2; a plurality of first cylindrical lenses 13; light beam merging unit 71 disposed to narrow a width in the Z-direction of a light flux emitted from first light source 2 by allowing partial light from the plurality of first cylindrical lenses 13 to pass through the light beam merging unit and reflecting remaining light; and condenser lens 9 configured to condense light emitted through light beam merging unit 71. First light source 2 includes the plurality of light emitting elements 47 disposed side by side in the Z-axis direction in the first column, and collimator lens array 46 provided with a plurality of collimator lens parts 46*a* disposed corresponding to the plurality of light emitting elements 47 in the first column. Light emitting element 47 includes first emitter 41 that emits first emitter light Lg1 and second emitter 43 that emits second emitter light Lg2, and collimator lens parts 46*a* each allow transmission of first emitter light Lg1 and second emitter light Lg2. The plurality of first cylindrical lenses 13 is disposed corresponding to the plurality of light emitting elements 47 in the first column to collimate first emitter light Lg1 and second emitter light Lg2 emitted from first light source 2.

Light fluxes emitted from the plurality of first light emitting elements 47 disposed side by side in the Z-axis direction in the first column can be reduced in width by light beam merging unit 71, so that coupling efficiency of light to be incident into optical fiber 35 can be improved, and thus light source device 1A can be provided in which both prevention of damage to an optical fiber and transmission of high-output light are achieved. Additionally, a light flux diameter of light to be incident into optical fiber 35 can be reduced, so that an optical fiber having a large diameter or a large numerical aperture is not required. The optical fiber can be reduced in diameter, so that cost of the optical fiber itself can be greatly reduced. The optical fiber can be reduced also in numerical aperture, so that an optical fiber made of a material such as a resin having low durability does not need to be used. Thus, the optical fiber can be improved in reliability.

First light source 2 of light source device 1A also includes a plurality of light emitting elements 47 in a second column that is disposed side by side in the Y-axis direction intersecting the Z-axis direction to correspond to the plurality of light emitting elements 47 in the first column. One light emitting element 47 of the plurality of light emitting elements 47 disposed side by side in the Y-axis direction in the first column and one light emitting element 47 of the plurality of light emitting elements 47 disposed side by side in the Y-axis direction in the second column emit first emitter light Lg1 and second emitter light Lg2 that are collimated by one first cylindrical lens 13.

Light from each of the plurality of light emitting elements 47 positioned side by side in the Y-axis direction can be collimated by one first cylindrical lens 13, and thus contributing to reduction in the number of components and miniaturization of the light source device.

Light source device 1A includes second light source 4 that emits green light, third light source 6 that emits blue light, and optical fiber 35 into which light condensed by condenser lens 9 is incident. First emitter light Lg1 and second emitter light Lg2 are each red light, and light emitted from first light source 2, second light source 4, and third light source 6 are each incident on condenser lens 9.

When the red light of first emitter light Lg1 and second emitter light Lg2 are collimated, white light synthesized with the red light together with the green light and the blue light can be condensed into the optical fiber by one condenser lens.

Third Exemplary Embodiment

[3-1. Configuration of Light Source Device]

Figure 12:
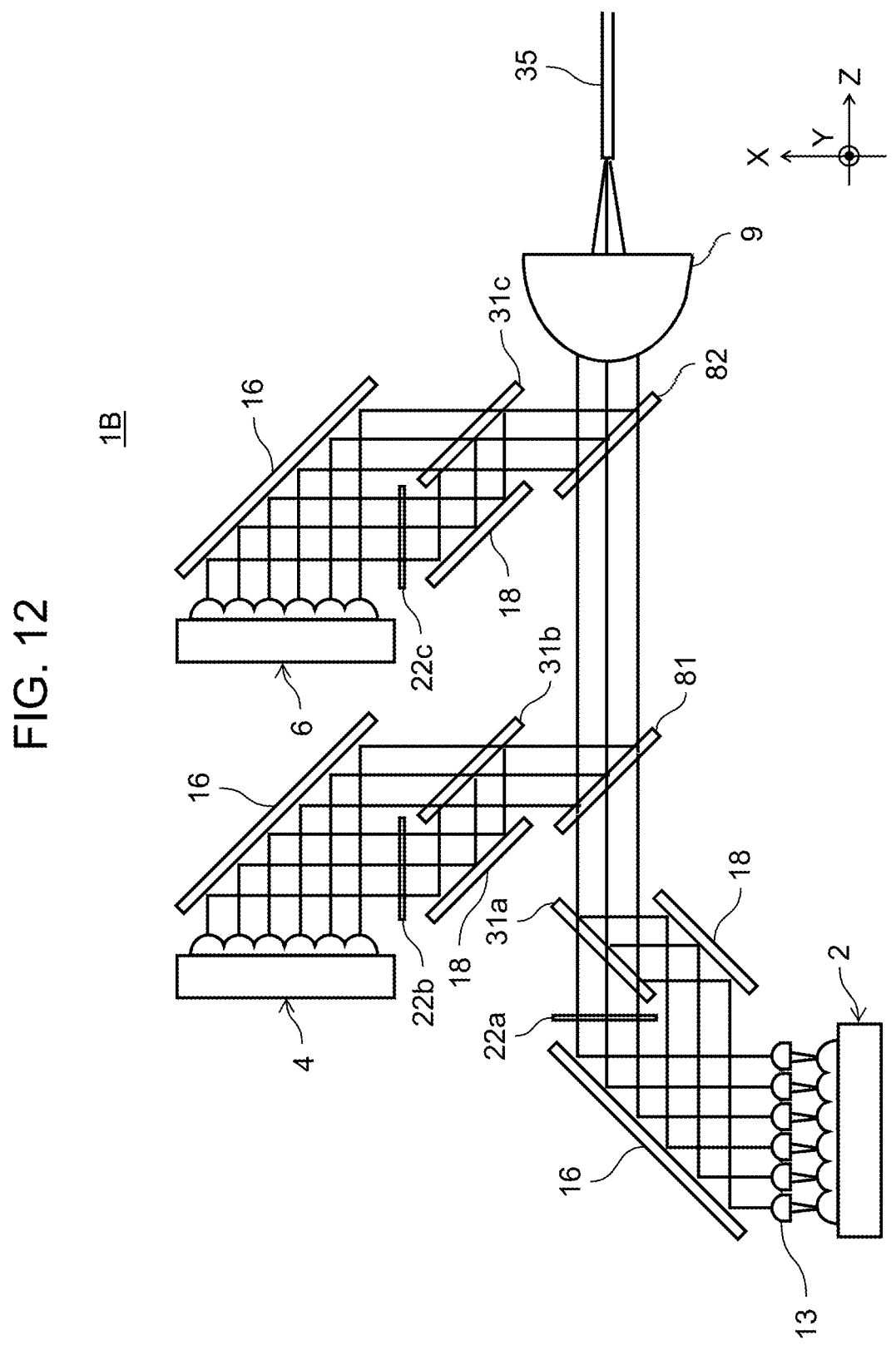
FIG. 12 is a plan view illustrating a configuration of a light source device according to a third exemplary embodiment.

FIG. 12 illustrates a configuration of light source device 1B according to a third exemplary embodiment. As illustrated in FIG. 12, light source device 1B includes first light source 2, second light source 4, third light source 6, first cylindrical lens 13, three reflection mirrors 16, three reflection mirrors 18, three half-wave plates 22*a*, 22*b*, 22*c*, three polarization beam splitters 31*a*, 31*b*, 31*c*, dichroic mirror 81, dichroic mirror 82, and condenser lens 9. Light source device 1B synthesizes light (e.g., red laser beams) emitted from first light source 2, light (e.g., green laser beams) emitted from second light source 4, and light (e.g., blue laser beams) emitted from third light source 6, and condenses the synthesized light into optical fiber 35. The same components as those of light source device 1A of the second exemplary embodiment are denoted by the same reference numerals, and duplicated description will not be described.

Light emitted from first light source 2 passes through first cylindrical lens 13 to be substantially collimated, and is reflected by reflection mirror 16. The light reflected by reflection mirror 16 is partially reflected by reflection mirror 18, and is incident on polarization beam splitter 31a as S-polarized light to be reflected. The rest of the light reflected by reflection mirror 16 is incident on half-wave plate 22a to have a polarization direction rotated by 90°, and is incident on polarization beam splitter 31a as P-polarized light to pass through it. Polarization beam splitter 31a serves as a light beam merging unit to enable reduction in width of a light flux by superimposing a plurality of light beams.

Light emitted from second light source 4 is reflected by reflection mirror 16. The light reflected by reflection mirror 16 is partially incident on half-wave plate 22b to have a polarization direction rotated by 90°, and then is reflected by reflection mirror 18 to be incident on polarization beam splitter 31b as S-polarized light to be reflected. The rest of the light reflected by reflection mirror 16 is incident on polarization beam splitter 31b as P-polarized light to pass through it. Polarization beam splitter 31b serves as a light beam merging unit to enable reduction in width of a light flux by superimposing a plurality of light beams.

Light emitted from third light source 6 is reflected by reflection mirror 16. The light reflected by reflection mirror 16 is partially incident on half-wave plate 22c to have a polarization direction rotated by 90°, and then is reflected by reflection mirror 18 to be incident on polarization beam splitter 31c as S-polarized light to be reflected. The rest of the light reflected by reflection mirror 16 is incident on polarization beam splitter 31c as P-polarized light to pass through it. Polarization beam splitter 31c serves as a light beam merging unit to enable reduction in width of a light flux by superimposing a plurality of light beams.

The light emitted from first light source 2 and superimposed by polarization beam splitter 31a passes through dichroic mirrors 81 and 82 to reach condenser lens 9. The light emitted from second light source 4 and superimposed by polarization beam splitter 31b is reflected by dichroic mirror 81, and passes through dichroic mirror 82 to reach condenser lens 9. The light emitted from third light source 6 and superimposed by polarization beam splitter 31c is reflected by dichroic mirror 82 to reach condenser lens 9. As described above, red light emitted from first light source 2 and green light emitted from second light source 4 are synthesized by dichroic mirror 81, and the synthesized light and blue light emitted from third light source 6 are synthesized by dichroic mirror 82, and condensed by the condenser lens 9 to be incident into optical fiber 35.

Even light source device 1B may include first to third light sources 2, 4, 6 different in placement order from that in the example illustrated in FIG. 12. In this case, light can be similarly synthesized by using a dichroic mirror having different characteristics instead of dichroic mirrors 81, 82, or changing a form of mirror placement. For example, although light source device 1B includes first light source 2 disposed with light emitting elements 47 in placement in which a column direction is the Z-axis direction, the column direction in the placement of light emitting elements 47 may be the X-direction as in second and third light sources 4, 6. First light source 2 can also be disposed with light emitting elements 47 in placement in which the column direction is the X-axis direction and a row direction is the Z-axis direction, or the column direction is the Z-axis direction and the row direction is the X-axis direction. In this case, an emission direction (Y-axis direction) of light from first light source 2 can be changed to the Z-axis direction or the X-axis direction by using reflection mirror 11 as described in the first exemplary embodiment.

[3-2. Effects, Etc.]

As described above, light source device 1B includes first light source 2, the plurality of first cylindrical lenses 13, polarization beam splitter 31a as the light beam merging unit disposed to narrow a width in the Z-axis direction of a light flux emitted from first light source 2 by allowing partial light from the plurality of first cylindrical lenses 13 to pass through the light beam merging unit and reflecting remaining light, and condenser lens 9 that condenses light emitted from polarization beam splitter 31a. First light source 2 includes the plurality of light emitting elements 47 disposed side by side in the Z-axis direction in the first column, and collimator lens array 46 provided with a plurality of collimator lens parts 46a disposed corresponding to the plurality of light emitting elements 47 in the first column. Light emitting element 47 includes first emitter 41 that emits first emitter light Lg1 and second emitter 43 that emits second emitter light Lg2, and collimator lens parts 46a each allow transmission of first emitter light Lg1 and second emitter light Lg2. The plurality of first cylindrical lenses 13 is disposed corresponding to the plurality of light emitting elements 47 in the first column to collimate first emitter light Lg1 and second emitter light Lg2 emitted from first light source 2.

Light fluxes emitted from the plurality of first light emitting elements 47 disposed side by side in the Z-axis direction in the first column can be reduced in width by polarization beam splitter 31a, so that coupling efficiency of light to be incident into optical fiber 35 can be improved, and thus light source device 1B can be provided in which both prevention of damage to an optical fiber and transmission of high-output light are achieved. Additionally, a light flux diameter of light to be incident into optical fiber 35 can be reduced, so that an optical fiber having a large diameter or a large numerical aperture is not required. The optical fiber can be reduced in diameter, so that cost of the optical fiber itself can be greatly reduced. The optical fiber can be reduced also in numerical aperture, so that an optical fiber made of a material such as a resin having low durability does not need to be used. Thus, the optical fiber can be improved in reliability.

First light source 2 of light source device 1B also includes a plurality of light emitting elements 47 in a second column that is disposed side by side in the Y-axis direction intersecting the Z-axis direction to correspond to the plurality of light emitting elements 47 in the first column. One light emitting element 47 of the plurality of light emitting elements 47 disposed side by side in the Y-axis direction in the first column and one light emitting element 47 of the plurality of light emitting elements 47 disposed side by side in the Y-axis direction in the second column emit first emitter light Lg1 and second emitter light Lg2 that are collimated by one first cylindrical lens 13.

Light from each of the plurality of light emitting elements 47 positioned side by side in the Y-axis direction can be collimated by one first cylindrical lens 13, and thus contributing to reduction in the number of components and miniaturization of the light source device.

Light source device 1B includes second light source 4 that emits green light, third light source 6 that emits blue light, and optical fiber 35 into which light condensed by condenser lens 9 is incident. First emitter light Lg1 and second emitter light Lg2 are each red light, and light emitted from first light source 2, second light source 4, and third light source 6 are each incident on condenser lens 9.

When the red light of first emitter light Lg1 and second emitter light Lg2 are collimated, white light synthesized with the red light together with the green light and the blue light can be condensed into the optical fiber by one condenser lens.

As described above, the exemplary embodiments have been described as an example of the technique according to the present disclosure. For this description, the accompanying drawings and the detailed descriptions have been provided. Thus, components described in the accompanying drawings and the detailed description may include not only components essential for solving the problem, but also components non-essential for solving the problem to illustrate the above techniques. For this reason, it should not be immediately recognized that these non-essential components are essential just because these non-essential components are described in the accompanying drawings and the detailed description.

The above-described exemplary embodiments are intended to exemplify the technique in the present disclosure, and thus various changes, replacements, additions, omissions, and the like can be made to the exemplary embodiments within the scope of the claims or equivalents of the claims.

Overview of Exemplary Embodiments (1) A light source device according to the present disclosure includes: a first light source; a plurality of first cylindrical lenses; a light beam merging unit disposed to narrow a width in a first direction of a light flux emitted from the first light source by allowing partial light from the plurality of first cylindrical lenses to pass through the light beam merging unit and reflecting remaining light; and a condenser lens configured to condense light emitted through the light beam merging unit. The first light source includes a plurality of light emitting elements disposed side by side in the first direction in a first column, and a plurality of collimator lens parts disposed corresponding to the plurality of light emitting elements in the first column. Each of the plurality of light emitting elements in the first column includes a first emitter that emits first light, and a second emitter that emits second light. Each of the plurality of collimator lens parts allows transmission of the first light and the second light. The plurality of first cylindrical lenses is disposed corresponding to the plurality of light emitting elements in the first column to collimate the first light and the second light emitted from the first light source.

This configuration enables providing a light source device that achieves both prevention of damage to an optical fiber and transmission of high-output light by improving coupling efficiency of light to be incident into the optical fiber as long as an end of the optical fiber is disposed at a focal position of the condenser lens.

(2) The light source device of item (1) is configured such that the plurality of light emitting elements in the first column is disposed in an array.

(3) The light source device of (1) is configured such that the first light source includes a plurality of light emitting elements disposed in a second column disposed side by side in a second direction to correspond to the plurality of respective light emitting elements in the first column, the second direction intersecting the first direction, and each of the plurality of light emitting elements in the second column includes a first emitter and a second emitter. One light emitting element of the plurality of light emitting elements in the first column is disposed in the second direction side by side to one light emitting element of the plurality of light emitting elements in the second column, and the first light and the second light from the one light emitting element of the plurality of light emitting elements in the first column and the first light and the second light from the one light emitting element of the plurality of light emitting elements in the second column are collimated by one first cylindrical lens of the plurality of first cylindrical lenses.

(4) The light source device of item (3) further includes a reflection mirror disposed on an optical path between one light emitting element of the plurality of light emitting elements in the first column and one light emitting element of the plurality of light emitting elements in the second column, and the one first cylindrical lens.

(5) The light source device of item (1) further includes one set of cylindrical lenses on an optical path between the light beam merging unit and the condenser lens.

(6) The light source device of any one of items (1) to (5) further includes a second light source that emits green light, a third light source that emits blue light, and an optical fiber into which light condensed by the condenser lens is incident. The first light and the second light are each red light, and the first light and the second light are each red light, and the first light source, the second light source, and the third light source each emit light that is incident on the condenser lens.

INDUSTRIAL APPLICABILITY

The present disclosure is applicable to a light source device that emits light from an emitter.

REFERENCE MARKS IN THE DRAWINGS 1, 1A, 1B light source device
2, 3, 3a, 3b first light source
4, 5 second light source
6, 7 third light source
9 condenser lens
9a focal position
11, 12, 15, 16, 17, 18, 21, 29, 30 reflection mirror
13 first cylindrical lens
19, 71 light beam merging unit
19a first surface
19b second surface
19c, 71a base material
19d, 71b reflection region
22, 22a, 22b, 22c, 32 half-wave plate
23, 31, 31a, 31b, 31c polarization beam splitter
25 second cylindrical lens
27 third cylindrical lens
33, 81, 82 dichroic mirror
35 optical fiber
35a end of optical fiber
40 first light source unit
41 first emitter
43 second emitter
45 collimator lens
46 collimator lens array
46a collimator lens part
47 light emitting element
50 second light source unit
60 third light source unit
Lg1 first emitter light
Lg2 second emitter light
Lga light

The invention claimed is:

1. A light source device comprising:
a first light source including:
    a plurality of light emitting elements disposed side by side in a first direction in a first column in columns, each of the plurality of light emitting elements in the first column including:
        a first emitter configured to emit first light; and
        a second emitter configured to emit second light; and
    a plurality of collimator lens parts arranged to correspond to the plurality of light emitting elements in the first column, each of the plurality of collimator lens parts being configured to allow transmission of the first light and the second light;
a plurality of first cylindrical lenses arranged to correspond to the plurality of respective light emitting elements in the first column to collimate the first light and the second light emitted from the first light source;
a light beam merging unit configured to narrow a width in the first direction of a light flux emitted from the first light source by allowing partial light from the plurality of first cylindrical lenses to pass through the light beam merging unit and reflecting remaining light;
a condenser lens configured to condense light emitted from the light beam merging unit; and
one set of cylindrical lenses on an optical path between the light beam merging unit and the condenser lens.

2. The light source device according to claim 1, wherein:
the first light source further includes a plurality of light emitting elements in a second column disposed side by side in a second direction intersecting the first direction to correspond to the plurality of light emitting elements in the first column,
each of the plurality of light emitting elements in the second column includes a first emitter and a second emitter, and a first light emitting element of the plurality of light emitting elements in the first column is arranged in the second direction side by side to a first light emitting element of the plurality of light emitting elements in the second column, and the first light and the second light from the first light emitting element of the plurality of light emitting elements in the first column and the first light and the second light from the first light emitting element of the plurality of light emitting elements in the second column are collimated by a first cylindrical lens of the plurality of first cylindrical lenses.

3. The light source device according to claim 2, further comprising a reflection mirror on an optical path between the first light emitting element of the plurality of light emitting elements in the first column and the first light emitting element of the plurality of light emitting elements in the second column, and the first cylindrical lens of the plurality of first cylindrical lenses.

4. The light source device according to claim 1, further comprising:
a second light source configured to emit green light;
a third light source configured to emit blue light; and
an optical fiber into which light condensed by the condenser lens is incident,
wherein the first light emitted by the first emitter of the first light source and the second light emitted by the second emitter of the second light source are both red light, and
wherein each of the first light source, the second light source, and the third light source is configured to emit light incident on the condenser lens and the optical fiber.

\* \* \* \* \*